(12) United States Patent
Hagen

(10) Patent No.: US 7,088,070 B2
(45) Date of Patent: Aug. 8, 2006

(54) RESONANT SCANNING MIRROR DRIVER CIRCUIT

(75) Inventor: Mark David Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/080,832

(22) Filed: Mar. 14, 2005

(65) Prior Publication Data

US 2005/0194922 A1 Sep. 8, 2005

Related U.S. Application Data

(63) Continuation-in-part of application No. 10/930,335, filed on Aug. 30, 2004, now Pat. No. 6,956,350, which is a continuation-in-part of application No. 10/172,579, filed on Jun. 14, 2002, now Pat. No. 6,812,669.

(51) Int. Cl.
*G05B 11/28* (2006.01)
(52) U.S. Cl. .................. 318/603; 318/629; 318/599
(58) Field of Classification Search ............... 318/569, 318/599, 600, 603, 629; 341/126, 127, 144, 341/147, 155
See application file for complete search history.

(56) References Cited

U.S. PATENT DOCUMENTS

| | | | | |
|---|---|---|---|---|
| 4,099,109 A | * | 7/1978 | Abbondanti | 318/811 |
| 4,806,946 A | * | 2/1989 | Ohnishi | 347/252 |
| 5,128,692 A | * | 7/1992 | Reisch | 347/252 |
| 5,432,536 A | * | 7/1995 | Takada et al. | 347/140 |
| 5,943,087 A | * | 8/1999 | Kataoka et al. | 347/250 |
| 6,182,235 B1 | * | 1/2001 | Ma et al. | 713/501 |
| 6,961,257 B1 | * | 11/2005 | Garverick et al. | 365/49 |

* cited by examiner

*Primary Examiner*—Bentsu Ro
(74) *Attorney, Agent, or Firm*—William B Kempler; W. James Brady, III; Frederick J. Telecky, Jr.

(57) ABSTRACT

A resonant scanning mirror driver configured to drive a micro-electro-mechanical system (MEMS) mirror to a desired deflection utilizes a PWM pattern selected from patterns having a preset number of bits. The patterns reflect the first positive quarters of the PWM pattern and the remaining quarters are generated utilizing the symmetry of the sine wave that is generated. Patterns having a harmonic distortion less than a preselected maximum are sorted into amplitude bins and ranked to generate a subset of patterns having a linearly varying deflection amplitude.

17 Claims, 5 Drawing Sheets

FIG. 4a
1 0 1 1 0 1 1 0 1 1 1 1 0 1 1 1 1 1 1 0 1 1 1 1 0 1 1 0 1 1 0 1
300 ⟶ 0 1 0 0 1 0 0 1 0 0 0 0 1 0 0 0 0 0 0 1 0 0 0 0 1 0 0 1 0 0 1 0
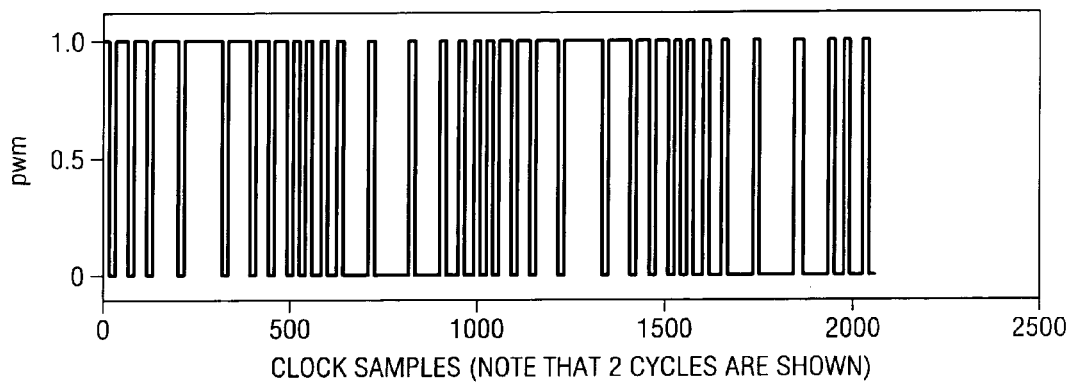
FIG. 4b
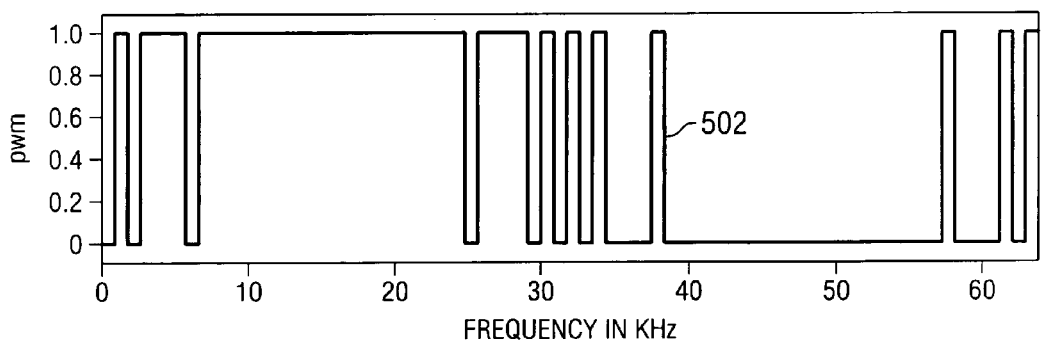
FIG. 5a
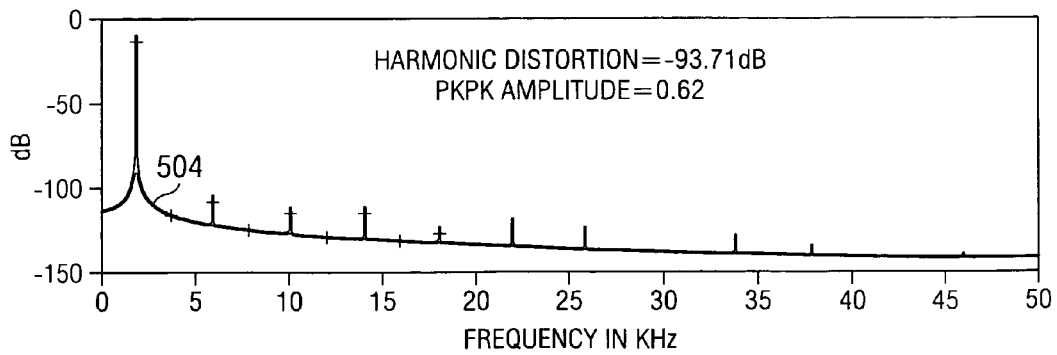
FIG. 5b
HARMONIC DISTORTION = −93.71dB
PKPK AMPLITUDE = 0.62

RESONANT SCANNING MIRROR DRIVER CIRCUIT

CROSS REFERENCES TO RELATED APPLICATIONS

This application is a continuation-in-part of U.S. patent application Ser. No. 10/930,335, which is now U.S. Pat. No. 6,956,350 B2, filed on Aug. 30, 2004, which is a continuation-in-part of U.S. patent application Ser. No. 10/172,579, filed on Jun. 14, 2002, now U.S. Pat. No. 6,812,669, which are incorporated herein by reference.

BACKGROUND OF THE INVENTION

This invention relates generally to micro-electro-mechanical system (MEMS) mirrors, and more particularly, to a MEMS resonant scanning mirror driver circuit.

DESCRIPTION OF THE PRIOR ART

Movement of a resonant MEMS mirror is accomplished using a control loop that includes a sinusoidal driver circuit. This driver circuit must have low harmonic distortion characteristics in order to precisely and accurately control movement of the MEMS mirror. Such driver circuits generally require use of either a precision analog oscillator or a fast and therefore expensive digital-to-analog converter (DAC) devices and accompanied sine wave logic to control the amplitude of the drive signal to a MEMS resonant scanning mirror.

In view of the foregoing, it would be desirable and advantageous in the MEMS mirror art to provide a resonant scanning mirror driver circuit that allows use of an inexpensive means of generating the sine wave and an inexpensive DAC with a relatively slow sample rate commensurate with a microprocessor based control algorithm.

SUMMARY OF THE INVENTION

The present invention is directed to a MEMS resonant scanning mirror driver circuit. The driver circuit has a PWM digital input that generates the sinusoidal waveform.

A first aspect of the present invention includes a resonant scanning mirror driver circuit configured to drive a micro-electro-mechanical system (MEMS) mirror to a desired deflection utilizing a PWM pattern having 64 bits, the pattern being selected according to the desired deflection from the group consisting of:

| index | positive pattern | relative amplitude | harmonic distortion |
|---|---|---|---|
| 0 | 0xB0C2 | 2.845 | −98.17 |
| 1 | 0xB124 | 2.895 | −92.05 |
| 2 | 0xC941 | 2.942 | −96.38 |
| 3 | 0x3141 | 3.005 | −94.90 |
| 4 | 0x3218 | 3.053 | −95.59 |
| 5 | 0x4A41 | 3.125 | −94.36 |
| 6 | 0x4C24 | 3.208 | −97.53 |
| 7 | 0x5181 | 3.239 | −95.11 |
| 8 | 0xE182 | 3.319 | −96.81 |
| 9 | 0xE244 | 3.367 | −93.99 |
| 10 | 0x8C44 | 3.432 | −97.66 |
| 11 | 0x8C81 | 3.481 | −92.77 |
| 12 | 0x6444 | 3.560 | −97.50 |
| 13 | 0x9301 | 3.597 | −91.58 |
| 14 | 0x1302 | 3.683 | −94.19 |
| 15 | 0x1484 | 3.729 | −97.78 |
| 16 | 0xA484 | 3.795 | −97.97 |
| 17 | 0x1884 | 3.856 | −98.05 |
| 18 | 0x2488 | 3.909 | −93.66 |
| 19 | 0x2504 | 3.969 | −97.91 |
| 20 | 0x2888 | 4.037 | −98.08 |
| 21 | 0x2904 | 4.097 | −96.77 |
| 22 | 0x4508 | 4.153 | −94.91 |
| 23 | 0xC908 | 4.208 | −92.19 |
| 24 | 0x4908 | 4.280 | −98.18 |
| 25 | 0xD108 | 4.342 | −99.94 |
| 26 | 0x5090 | 4.367 | −91.70 |
| 27 | 0xE090 | 4.433 | −90.73 |
| 28 | 0x8910 | 4.480 | −91.62 |
| 29 | 0x5208 | 4.526 | −98.36 |
| 30 | 0x6110 | 4.607 | −94.60 |
| 31 | 0x0A10 | 4.663 | −92.70 |
| 32 | 0x9210 | 4.725 | −97.39 |
| 33 | 0x0C10 | 4.784 | −96.82 |
| 34 | 0x9410 | 4.845 | −98.37 |
| 35 | 0x1410 | 4.917 | −93.69 |
| 36 | 0x9810 | 4.972 | −98.20 |
| 37 | 0x1810 | 5.044 | −92.40 |
| 38 | 0x7010 | 5.100 | −93.21 |
| 39 | 0x2420 | 5.123 | −96.65 |
| 40 | 0xC420 | 5.193 | −93.58 |
| 41 | 0x2820 | 5.251 | −98.75 |
| 42 | 0xB020 | 5.312 | −98.24 |
| 43 | 0x3020 | 5.384 | −92.38 |
| 44 | 0x3040 | 5.465 | −92.31 |
| 45 | 0x4840 | 5.473 | −97.10 |
| 46 | 0xD040 | 5.534 | −97.85 |
| 47 | 0x5040 | 5.606 | −94.63 |
| 48 | 0xE040 | 5.672 | −92.83 |
| 49 | 0xE080 | 5.764 | −94.04 |
| 50 | 0x8900 | 5.810 | −90.04 |
| 51 | 0x6080 | 5.836 | −98.88 |
| 52 | 0x9100 | 5.944 | −95.76 |
| 53 | 0x0A00 | 5.994 | −90.67 |
| 54 | 0x1100 | 6.016 | −95.83 |
| 55 | 0xA100 | 6.082 | −95.28 |
| 56 | 0x1200 | 6.128 | −96.54 |
| 57 | 0xA200 | 6.194 | −99.83 |
| 58 | 0x2200 | 6.266 | −95.22 |
| 59 | 0xA400 | 6.314 | −95.60 |
| 60 | 0x2400 | 6.386 | −98.64 |
| 61 | 0xA800 | 6.441 | −95.37 |
| 62 | 0x2800 | 6.513 | −96.00 |
| 63 | 0xB000 | 6.575 | −94.93 |

A second aspect of the invention is provided by a micro-electro-mechanical system (MEMS) resonant scanning mirror driver utilizing a PWM pattern of a preselected number of bits to drive the mirror to a desired deflection comprising a selection circuit for selecting one of a grouping of PWM patterns of the preselected number of bits, the grouping having less than a predetermined maximum harmonic distortion and a linearly varying deflection amplitude.

A third aspect of the invention comprises a method of selecting PWM patterns of a given bit length for driving a resonant scanning mirror. The harmonic distortion and amplitude deflection for a subset of patterns having a preselected bit length are calculated. Patterns from the subset having a maximum harmonic distortion are selected. The selected patterns are sorted into bins, the number M of bins being equal to a predetermined number of steps of deflection control. The patterns which are closest to the center of a bin are selected to generate a grouping of bit patterns for controlling amplitude of mirror deflection.

BRIEF DESCRIPTION OF THE DRAWINGS

Other aspects, features and advantages of the present invention will be readily appreciated, as the invention becomes better understood by reference to the following detailed description when considered in connection with the accompanying drawing figure wherein:

FIGS. 4a and 4b illustrate a digital pattern and a waveform diagram showing a single pulse width modulated digital signal wherein the single pulse width modulated digital signal shown in FIG. 4b is generated from the digital pattern shown in FIG. 4a;

FIG. 5 is a plot of the amplitude and distortion for the best ranked 64 clock PWM pattern.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, movement of a MEMS mirror is accomplished using a control loop that includes a driver circuit. This driver circuit must have low harmonic distortion characteristics in order to precisely and accurately control movement of the MEMS mirror. Such driver circuits generally require use of fast and therefore expensive digital-to-analog converter (DAC) devices to control the amplitude of the drive signal to a MEMS resonant scanning mirror. A resonant scanning mirror driver circuit that allows use of a relatively slow and therefore inexpensive DAC to control the amplitude of the drive signal to the MEMS resonant scanning mirror is now described below with reference to FIGS. 1–5.

Figure 1:
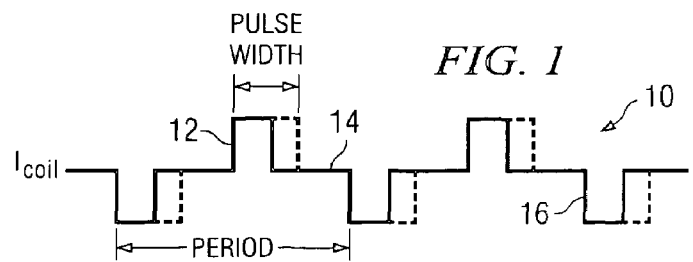
FIG. 1 is a timing diagram depicting a tri-level PWM pulse waveform.

FIG. 1 is a waveform diagram depicting a tri-level PWM pulse waveform 10 associated with the current passing through a MEMS resonant scanning mirror device. PWM pulse waveform 10 has a positive pulse 12, a nominal zero level 14, and a negative pulse 16.

Figure 2:
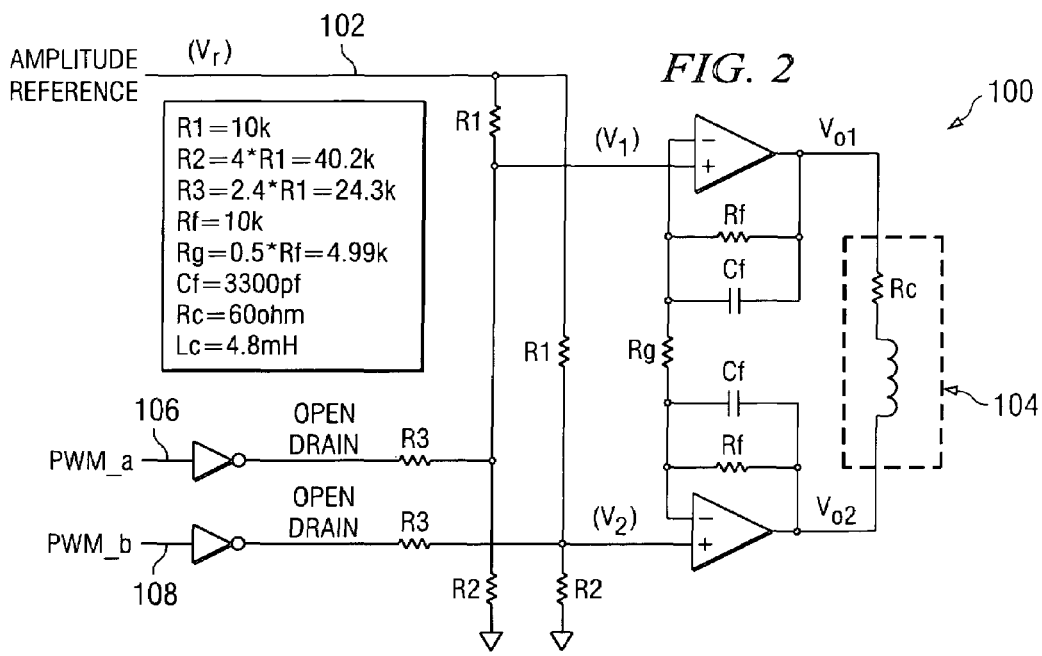
FIG. 2 is a schematic diagram illustrating a resonant scanning mirror driver circuit according to one embodiment of the present invention.

FIG. 2 is a schematic diagram illustrating a resonant scanning mirror driver circuit 100 according to one embodiment of the present invention. Driver circuit 100 has an analog input 102 to set the amplitude of sinusoidal drive voltage to the MEMS resonant scanning mirror device 104. Driver circuit 100 further has PWM digital inputs 106, 108 that provide a tri-level PWM pulse waveform, such as waveform 10 depicted in FIG. 1, to generate the desired sinusoidal waveform signal to the MEMS device 104. Driver circuit 100 generates a voltage output, and therefore is sensitive to temperature induced changes in the MEMS device 104 coil resistance Rc. Those skilled in the resonant scanning mirror art will readily appreciate that such a voltage output will provide several advantages over a transconductance amplifier if the actual application includes a beam position feedback. Resonant scanning mirror driver circuit 100 was found by the present inventor to achieve less than −60 dB harmonic distortion in a laser beam deflection using its lowest possible PWM clock.

Resonant scanning mirror driver circuit 100 can be defined mathematically according to its transfer function written as $$\frac{I_{coil}}{(v_1 - v_2)} = \frac{\left(\frac{1}{L_c}s + \frac{G\omega^2}{R_c}\right)}{s^2 + \frac{R_c}{L_c}s + \omega^2} = \frac{\frac{1}{L_c}\left(s + \frac{G}{R_f C_f}\right)}{s^2 + \frac{R_c}{L_c}s + \omega^2}, \quad \text{(equation 1)}$$

where the DC voltage gain is $$G = 1 + \frac{2R_f}{R_g} = 5$$

for the component values set forth in FIG. 2. Since the cutoff frequency is defined by $$\omega^2 = \frac{R_c}{R_f L_c C_f},$$

the values $R_c$=60 Ohms, $L_c$=4.8 mH, and $C_f$=3300 pF shown in FIG. 1 yield a cutoff of 3.1 kHz. The Q of the poles for these component values is $$\frac{\omega L_c R_c}{R_c^2 + L_c^2 \omega^2} \approx \frac{\omega L_c}{R_c} = 1.5.$$

The zero is then at $$\omega_z = \frac{G}{R_f C_f} = 24 \text{ kHz}.$$

The input network associated with driver circuit 100 is configured such that the voltage applied to the analog input Vr is also applied across the MEMS device 104 coil.

The mechanical transfer function according to one embodiment of the MEMS mirror 104 can be mathematically defined as $$\frac{\text{deflection}}{I_{coil}} = \frac{\omega_{res}^2}{s^2 + \frac{\omega_{res}}{Q}s + \omega_{res}^2}, \quad \text{(equation 2)}$$

for a normalized deflection gain, where the resonant frequency ωres for the MEMS mirror 104 was found to be 3,100 Hz with a Q=50. The harmonic distortion in deflection associated with the above MEMS mirror 104 can be mathematically defined as $$10\log_{10}\left(\frac{\sum_{n=2}^{9} harm_n}{harm_1}\right). \quad \text{(equation 3)}$$

Figure 3:
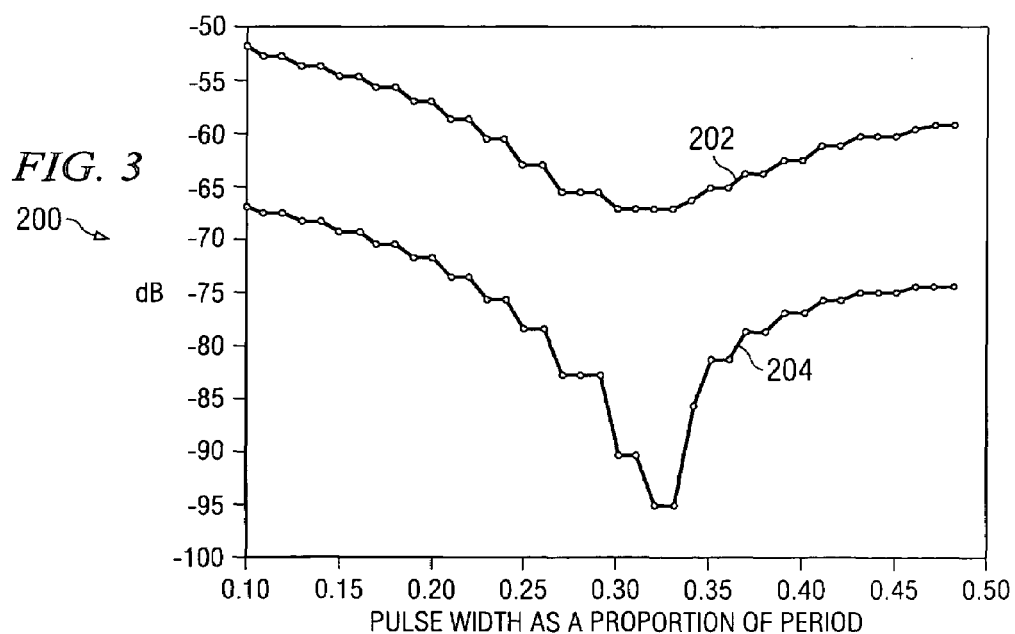
FIG. 3 is a graph illustrating harmonic distortion with respect to pulse width and pulse width as a proportion of period for the resonant scanning mirror driver circuit shown in FIG. 2 when driven with a tri-level PWM pulse waveform such as depicted in FIG. 1.

FIG. 3 is a graph illustrating harmonic distortion 200 with respect to pulse width, and pulse width as a proportion of period for the resonant scanning mirror driver circuit 100 shown in FIG. 2 when driven with a tri-level PWM pulse waveform such as depicted in FIG. 1. Specifically, the upper plot 202 shows the harmonic distortion with a high bandwidth on the amplifier, while the lower plot 204 shows the harmonic distortion with a bandwidth of 3.1 kHz. The best performance can be seen to occur when the positive and negative pulses are each about ⅓ of a period. The harmonics in the deflection can then be virtually eliminated by limiting the bandwidth of the amplifier.

FIGS. 4a and 4b depict a waveform diagram showing a single pulse width modulated (PWM) digital signal 300. PWM signal 300 can also be used to generate a sine wave for the MEMS mirror 104 coil drive so long as PWM signal 300 has a sufficiently high clock rate so that the harmonics in the digital signal are attenuated by the transfer function of the associated mirror driver circuit. Specifically, FIG. 4a depicts a digital pattern that is repeated continuously to generate the PWM waveform with a 64× oversample clock seen in FIG. 4b, wherein the digital clock is set to 64× the resonant frequency of the MEMS device. The single pulse width modulated digital signal 300 was found by the present inventor to provide less harmonic distortion (<−100 dB) than that achievable using the tri-level scheme described herein before with reference to FIGS. 1–3.

It is desirable to find the PWM signals that have bit patterns which minimize the harmonic distortion in the sine wave mirror deflection. It is also desirable to find the bit patterns that provide the low harmonic distortion and a high amplitude, so that the drive signal is efficiently generated. In the examples given, the number of bits equals the number of clock cycles, as each bit takes one clock cycle. A process for determining these bit patterns is described below and tables containing the best sequences for various pattern bit lengths are provided.

In order to pick the best PWM patterns, the mirror dynamics are modeled as an underdamped second order linear system represented by a restatement of equation 2:

$$\text{deflection}(s) = \frac{\omega_o^2}{s^2 + \frac{\omega_o}{Q}s + \omega_o^2} i_{coil}$$

and the mirror deflection coil transfer function is modeled as $$i_{coil}(s) = \frac{1}{L_{coil}} \cdot \frac{1}{s + \frac{R_{coil} + R_s}{L_{coil}}} v_{drive} \quad \text{(equation 4)}$$

In one example Q=50, $\omega_o$=2*π*3000 $R_{coil}$+$R_s$=60 ohms and $L_{coil}$=4.5 mH The desired number of clocks per period for the PWM pattern is chosen. This does not have to be a binary multiple, but if it is divisible by 8 we can take into account symmetries when searching for the best patterns that will substantially reduce the effort in finding the best patterns. Note that the second half of a sine wave is the negative of the first half. This means that the binary values for the second half of the PWM pattern that best generates a sine wave will be the binary inverse of the first half of the PWM pattern. This reduces the number of possible patterns from $2^N$ to $$2^{\frac{N}{2}}.$$

Also note that the second quarter of a sine wave is the time reversed version of the first quarter. Therefore by constructing the candidate patterns with this property we can reduce the number of patterns to search to $$2^{\frac{N}{4}}.$$

Finally, for every positive going PWM generated sine wave, there will be a negative going sine wave with the same harmonic distortion characteristic. These complementary patterns will be the binary inverse of each other. Therefore we can limit the search further by forcing the first bit to be a zero. This means that $$2^{(\frac{N}{4}-1)}$$

patterns need to be searched to locate all possible candidate patterns. For example, if N=64 then 32,768 patterns need to be evaluated. This reduces the problem to a manageable number of patterns to be evaluated. Without taking advantage of these symmetries, the number would be $2^{64}$=18, 446, 744, 073, 709, 551, 616 patterns for evaluation, an unmanageable task.

To estimate the performance of each PWM pattern, the digital sample rate is set at N*$f_o$ (or higher) and the second order linear model of the mirror dynamics is represented as a discrete time model of the system. Each PWM pattern is constructed using the symmetry described above and the pattern repeated K times. This repeated pattern is used as the input to the discrete time model of the mirror. The pattern needs to be repeated enough times to allow the natural response of the dynamic model to die off. Simulations show that for a Q of 50, consistent results are obtained with 50 or more repetitions. The Fast Fourier Transform (FFT) of the resulting estimated deflection is taken. The amplitude of the first harmonic is found and the harmonic distortion defined as the ratio of the power of the first harmonic to the sum of the powers of the 2nd through 9th harmonics, is calculated, utilizing equation 3.

All patterns with harmonic distortion above a desired level are rejected. For N=64 there are over 350 patterns with a harmonic distortion better than −80 dB. The patterns with acceptable harmonic distortion, are ranked according to both amplitude and distortion as follows:

$$\text{rank} = -\text{weight}_{HD} \cdot HD_n + \frac{\text{range}(HD)}{\text{range}(Amp)} Amp_n \quad \text{(equation 5)}$$

where $HD_n$ is the harmonic distortion for each trial pattern, $Amp_n$, is the deflection amplitude of each trial pattern, $\text{weight}_{HD}$ is the desired weight of HD over Amp and the function range () is the max()-min() of the values in the population. For the results tabulated, $\text{weight}_{HD}$ was set to 1.1 to weight HD 10% more than amplitude.

The following Tables 1–5 list the ten best patterns for patterns having 32, 40, 48, 56 and 64 clock PWM patters, respectively. FIG. 5 shows the amplitude and harmonic distortion for the best ranked 64 clock PWM pattern.

TABLE 1

Ten Best 32 Clock PWM Patterns

| pattern number | harmonic distortion | amplitude | pos quarter pattern | neg quarter pattern | rank |
|---|---|---|---|---|---|
| 64 | −83.62 | 0.661 | 10111111 | 01000000 | 107.14 |
| 32 | −81.72 | 0.608 | 11011111 | 00100000 | 103.83 |
| 16 | −78.63 | 0.561 | 11101111 | 00010000 | 99.36 |
| 63 | −76.43 | 0.633 | 00111111 | 11000000 | 98.59 |
| 127 | −71.72 | 0.718 | 01111111 | 10000000 | 95.36 |
| 119 | −76.05 | 0.491 | 01110111 | 10001000 | 94.92 |
| 111 | −73.99 | 0.532 | 01101111 | 10010000 | 93.59 |
| 36 | −76.86 | 0.350 | 11011011 | 00100100 | 92.58 |
| 95 | −72.09 | 0.579 | 01011111 | 10100000 | 92.58 |
| 59 | −75.70 | 0.375 | 00111011 | 11000100 | 91.88 |

TABLE 2

Ten Best 40 Clock PWM Patterns

| pattern number | harmonic distortion | amplitude | pos quarter pattern | neg quarter pattern | rank |
|---|---|---|---|---|---|
| 64 | −84.94 | 0.624 | 1110111111 | 0001000000 | 108.02 |
| 128 | −83.99 | 0.657 | 1101111111 | 0010000000 | 107.74 |
| 383 | −83.46 | 0.639 | 0101111111 | 1010000000 | 106.74 |
| 447 | −82.59 | 0.606 | 0110111111 | 1001000000 | 105.01 |
| 479 | −83.07 | 0.576 | 0111011111 | 1000100000 | 104.83 |
| 255 | −80.45 | 0.674 | 0011111111 | 1100000000 | 104.25 |
| 272 | −80.83 | 0.514 | 1011101111 | 0100010000 | 100.92 |
| 256 | −75.88 | 0.692 | 1011111111 | 0100000000 | 99.64 |
| 136 | −80.75 | 0.457 | 1101110111 | 0010001000 | 99.51 |
| 247 | −79.78 | 0.474 | 0011110111 | 1100001000 | 98.84 |

TABLE 3

Ten Best 48 Clock PWM Patterns

| pattern number | harmonic distortion | amplitude | pos quarter pattern | neg quarter pattern | rank |
|---|---|---|---|---|---|
| 1791 | −87.54 | 0.648 | 011011111111 | 100100000000 | 115.22 |
| 1919 | −86.16 | 0.626 | 011101111111 | 100010000000 | 113.06 |
| 1467 | −92.28 | 0.358 | 010110111011 | 101001000100 | 111.97 |
| 1088 | −85.30 | 0.580 | 101110111111 | 010001000000 | 110.77 |
| 991 | −85.20 | 0.549 | 001111011111 | 110000100000 | 109.75 |
| 1535 | −80.83 | 0.672 | 010111111111 | 101000000000 | 108.54 |
| 1536 | −81.18 | 0.646 | 100111111111 | 011000000000 | 108.17 |
| 1519 | −84.30 | 0.509 | 010111101111 | 101000010000 | 107.60 |
| 544 | −82.73 | 0.537 | 110111011111 | 001000100000 | 106.68 |
| 1152 | −80.31 | 0.601 | 101101111111 | 010010000000 | 105.89 |

TABLE 4

Ten Best 56 Clock PWM Patterns

| pattern number | harmonic distortion | amplitude | pos quarter pattern | neg quarter pattern | rank |
|---|---|---|---|---|---|
| 4352 | −93.00 | 0.622 | 10111011111111 | 01000100000000 | 118.39 |
| 4608 | −91.32 | 0.638 | 10110111111111 | 01001000000000 | 116.95 |
| 3967 | −90.60 | 0.598 | 00111101111111 | 11000010000000 | 115.14 |
| 3839 | −87.87 | 0.613 | 00111011111111 | 11000100000000 | 112.52 |
| 2176 | −88.12 | 0.589 | 11011101111111 | 00100010000000 | 112.17 |
| 5879 | −91.42 | 0.440 | 01011011110111 | 10100100001000 | 111.95 |
| 6079 | −87.92 | 0.567 | 01011110111111 | 10100001000000 | 111.38 |
| 5120 | −85.53 | 0.655 | 10101111111111 | 01010000000000 | 111.03 |
| 6176 | −86.32 | 0.536 | 10011111011111 | 01100000100000 | 108.82 |
| 3583 | −83.77 | 0.629 | 00110111111111 | 11001000000000 | 108.42 |

TABLE 5

Ten Best 64 Clock PWM Patterns

| pattern number | harmonic distortion | amplitude | pos quarter pattern | neg quarter pattern | rank |
|---|---|---|---|---|---|
| 24063 | −93.934 | 0.617 | 0101110111111111 | 1010001000000000 | 119.40 |
| 9216 | −92.709 | 0.637 | 1101101111111111 | 0010010000000000 | 118.58 |
| 8704 | −90.778 | 0.625 | 1101110111111111 | 0010001000000000 | 116.14 |
| 24319 | −89.925 | 0.606 | 0101111011111111 | 1010000100000000 | 114.71 |
| 24704 | −90.38 | 0.582 | 1001111101111111 | 0110000010000000 | 114.58 |
| 15359 | −88.66 | 0.644 | 0011101111111111 | 1100010000000000 | 114.31 |
| 23419 | −94.756 | 0.378 | 0101101101111011 | 1010010010000100 | 114.08 |
| 4608 | −88.696 | 0.611 | 1110110111111111 | 0001001000000000 | 113.49 |
| 10240 | −87.69 | 0.649 | 1101011111111111 | 0010100000000000 | 113.37 |
| 10272 | −90.616 | 0.523 | 1101011111011111 | 0010100000100000 | 113.30 |

The PWM patterns can be sorted by the estimated deflection amplitude in order to obtain a digital amplitude control over the mirror deflection. This would permit the use of a very low cost circuit to control the mirror deflection.

The sorting can be accomplished by defining the desired range of amplitude deflection and the number of bits of resolution in amplitude deflection desired. For instance, with the number of bits N=64 and the quality factor Q=50, the maximum amplitude occurs with a square wave drive. Choosing a deflection amplitude 5% or 10% less than this and a lower amplitude at ½ of this upper level will provide a ±25% deflection range control.

The number of steps of deflection control M is chosen and the patterns with good harmonic distortion and within the desired deflection range are sorted into M bins. In each bin the patterns are weighted according to how close the deflection amplitude is to the center of the bin and how good the harmonic distortion of the pattern is. For instance, we could set M=64 and weight each pattern in each bin as:

weight=40*abs(patternAmp−centerAmp)+(patternHD+90);

By picking the best pattern in each bin as defined by the above weighting, we can generate a table of M PWM patterns that have very good harmonic distortion and linearly changing deflection amplitude.

This technique was employed to generate a table of 64 patterns having a harmonic distortion better than 90 db and having a linearly changing deflection amplitude ranging from a low of 2.85 units to a high of 6.5 units in 64 steps. These are illustrated in Table 6. In Table 6, the patterns are 64 bit patterns. The number shown in the positive pattern column of Table 6 is the hexadecimal notation for the bits of the first quarter of the sine wave. As in the embodiments described above in connection with Tables 1–5, the second quarter of the sine wave is the time reversed version of the first quarter. The second half of the sine wave is the negative of the first half. The binary values of the second half of the PWM pattern will be the binary inverse of the first half pattern.

TABLE 6

| index | positive pattern | relative amplitude | harmonic distortion |
|---|---|---|---|
| 0 | 0xB0C2 | 2.845 | −98.17 |
| 1 | 0xB124 | 2.895 | −92.05 |
| 2 | 0xC941 | 2.942 | −96.38 |
| 3 | 0x3141 | 3.005 | −94.90 |
| 4 | 0x3218 | 3.053 | −95.59 |
| 5 | 0x4A41 | 3.125 | −94.36 |
| 6 | 0x4C24 | 3.208 | −97.53 |
| 7 | 0x5181 | 3.239 | −95.11 |
| 8 | 0xE182 | 3.319 | −96.81 |
| 9 | 0xE244 | 3.367 | −93.99 |
| 10 | 0x8C44 | 3.432 | −97.66 |
| 11 | 0x8C81 | 3.481 | −92.77 |
| 12 | 0x6444 | 3.560 | −97.50 |
| 13 | 0x9301 | 3.597 | −91.58 |
| 14 | 0x1302 | 3.683 | −94.19 |
| 15 | 0x1484 | 3.729 | −97.78 |
| 16 | 0xA484 | 3.795 | −97.97 |
| 17 | 0x1884 | 3.856 | −98.05 |
| 18 | 0x2488 | 3.909 | −93.66 |
| 19 | 0x2504 | 3.969 | −97.91 |
| 20 | 0x2888 | 4.037 | −98.08 |
| 21 | 0x2904 | 4.097 | −96.77 |
| 22 | 0x4508 | 4.153 | −94.91 |
| 23 | 0xC908 | 4.208 | −92.19 |
| 24 | 0x4908 | 4.280 | −98.18 |
| 25 | 0xD108 | 4.342 | −99.94 |
| 26 | 0x5090 | 4.367 | −91.70 |
| 27 | 0xE090 | 4.433 | −90.73 |
| 28 | 0x8910 | 4.480 | −91.62 |
| 29 | 0x5208 | 4.526 | −98.36 |
| 30 | 0x6110 | 4.607 | −94.60 |
| 31 | 0x0A10 | 4.663 | −92.70 |
| 32 | 0x9210 | 4.725 | −97.39 |
| 33 | 0x0C10 | 4.784 | −96.82 |
| 34 | 0x9410 | 4.845 | −98.37 |
| 35 | 0x1410 | 4.917 | −93.69 |
| 36 | 0x9810 | 4.972 | −98.20 |
| 37 | 0x1810 | 5.044 | −92.40 |
| 38 | 0x7010 | 5.100 | −93.21 |
| 39 | 0x2420 | 5.123 | −96.65 |
| 40 | 0xC420 | 5.193 | −93.58 |
| 41 | 0x2820 | 5.251 | −98.75 |
| 42 | 0xB020 | 5.312 | −98.24 |
| 43 | 0x3020 | 5.384 | −92.38 |
| 44 | 0x3040 | 5.465 | −92.31 |
| 45 | 0x4840 | 5.473 | −97.10 |
| 46 | 0xD040 | 5.534 | −97.85 |
| 47 | 0x5040 | 5.606 | −94.63 |
| 48 | 0xE040 | 5.672 | −92.83 |
| 49 | 0xE080 | 5.764 | −94.04 |
| 50 | 0x8900 | 5.810 | −90.04 |
| 51 | 0x6080 | 5.836 | −98.88 |
| 52 | 0x9100 | 5.944 | −95.76 |
| 53 | 0x0A00 | 5.994 | −90.67 |
| 54 | 0x1100 | 6.016 | −95.83 |
| 55 | 0xA100 | 6.082 | −95.28 |
| 56 | 0x1200 | 6.128 | −96.54 |
| 57 | 0xA200 | 6.194 | −99.83 |

TABLE 6-continued

| index | positive pattern | relative amplitude | harmonic distortion |
|---|---|---|---|
| 58 | 0x2200 | 6.266 | −95.22 |
| 59 | 0xA400 | 6.314 | −95.60 |
| 60 | 0x2400 | 6.386 | −98.64 |
| 61 | 0xA800 | 6.441 | −95.37 |
| 62 | 0x2800 | 6.513 | −96.00 |
| 63 | 0xB000 | 6.575 | −94.93 |

Figure 6:
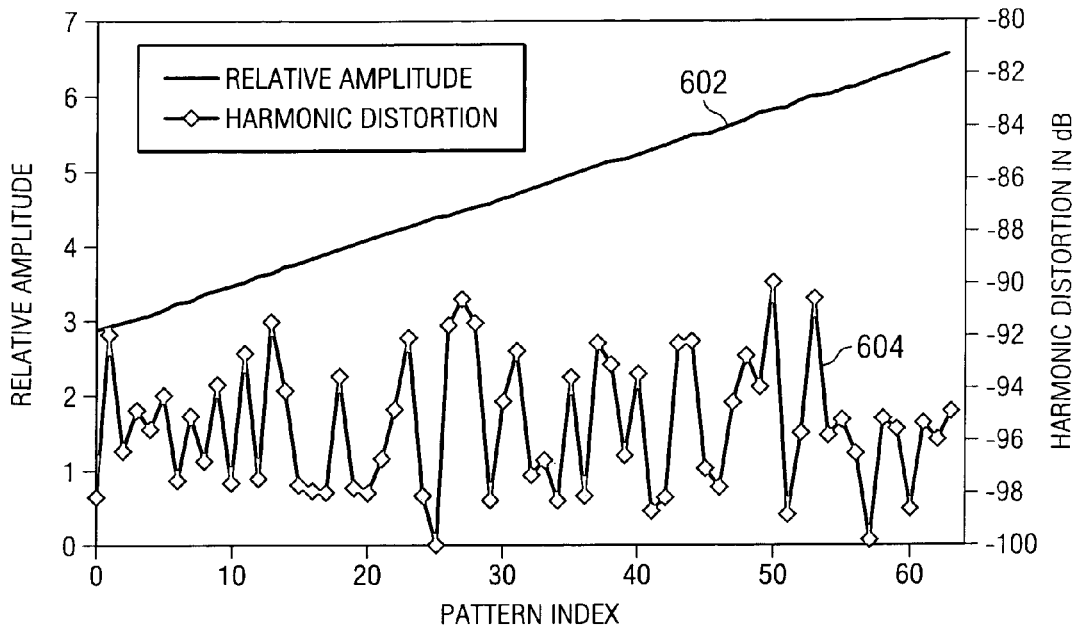
FIG. 6 illustrates the amplitude and the harmonic distortion for the selected group of Table 6.

FIG. 6 shows a plot of the range of amplitude that is available utilizing the PWM patterns of Table 6 as plot 602. The harmonic distortions of these patterns is shown by plot 604. As can be seen from plot 602, choosing from among the 64 possible patterns produces a highly linear variation in the amplitude of the signal applied to the mirror to control the amplitude of the mirror deflection. This is accomplished while keeping the harmonic distortion below a predetermined level.

Figure 7:
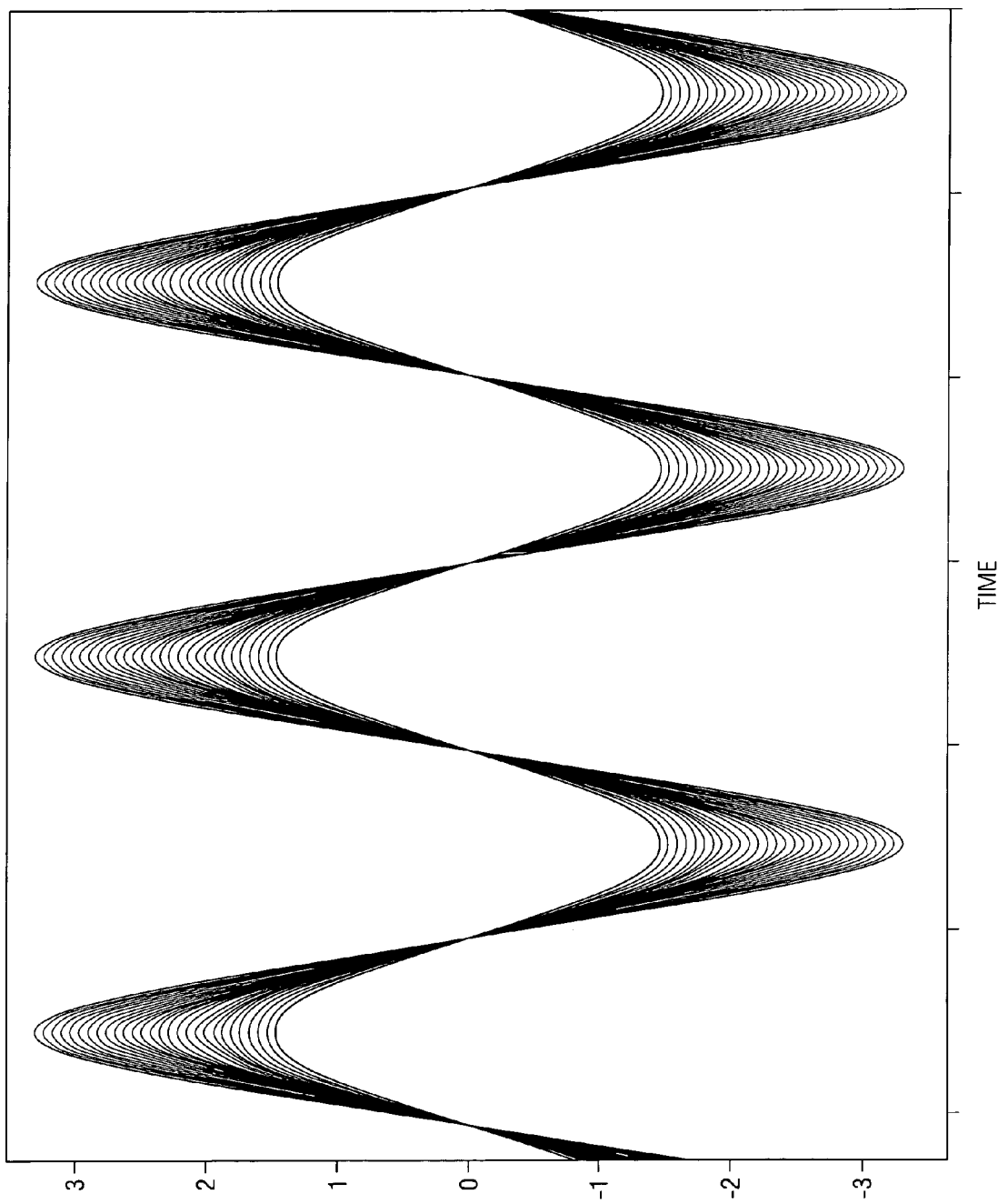
FIG. 7 illustrates a time series of all 64 selected patterns of the group of Table 6.

FIG. 7 is a plot showing the 64 sine wave curves plotted utilizing the data of Table 6. As can be seen from the figure, this plot yields sine waves of the same frequency but varying amplitude.

Figure 8:
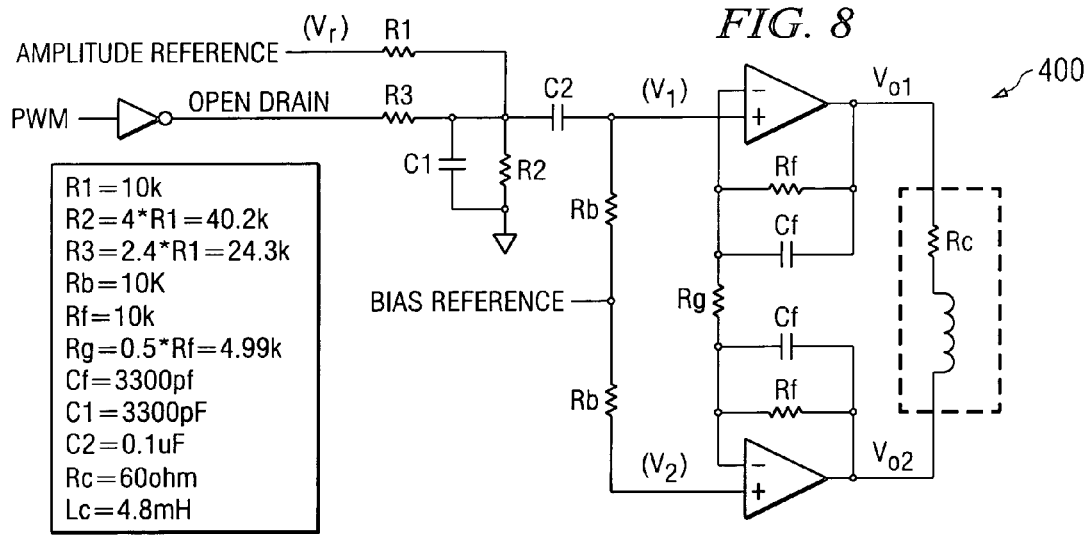
FIG. 8 is a schematic diagram illustrating a resonant scanning mirror driver circuit according to another embodiment of the present invention and that can be driven with the single pulse width modulated digital signal shown in FIG. 4b.

FIG. 8 is a schematic diagram illustrating a resonant scanning mirror driver circuit 400 and that can be driven with the single pulse width modulated digital signal 300 shown in FIG. 4b. It can also be used with the PWM patterns shown in Tables 1–6 and FIG. 5. The bias input level most preferably is set to the middle of the operating range of the input signal.

Figure 9:
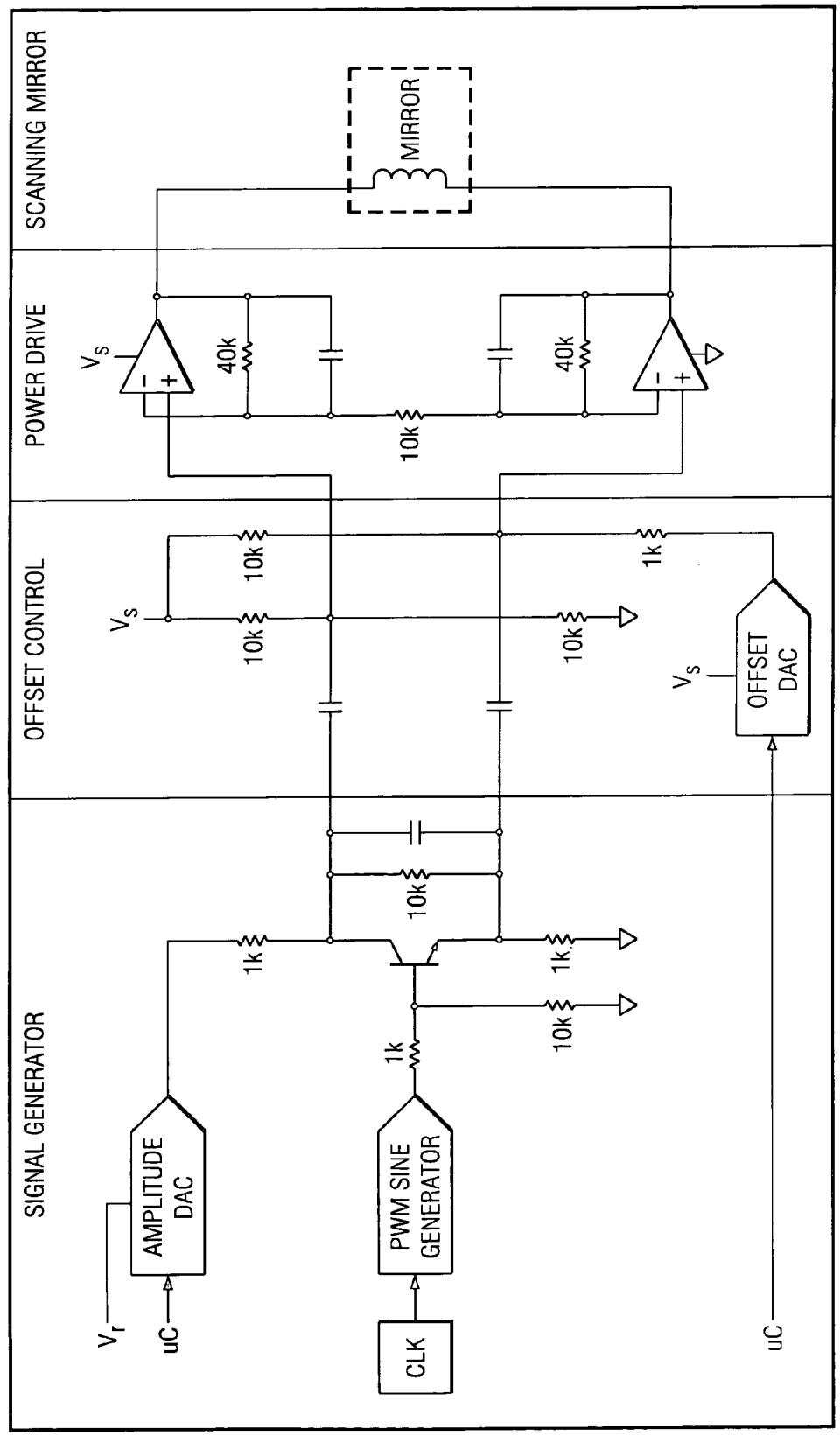
FIG. 9 is a schematic diagram illustrating a resonant scanning mirror driver circuit according to yet another embodiment of the present invention and that can be driven with the single pulse width modulated digital signal shown in FIG. 4b.

FIG. 9 is a schematic diagram illustrating a resonant scanning mirror driver circuit 900 according to yet another embodiment of the present invention and that is also suitable to be driven with the single pulse width modulated digital signal shown in FIG. 4b that is generated via the digital pattern shown in FIG. 4a. It can also be used with the PWM patterns of Tables 1–6 and FIG. 5. Driver circuit 900 can be shown to have a more symmetric output voltage. The output is defined according to the relationship $$v_{out} = \frac{s + (A+1)\omega}{s + \omega} v_{in},$$ (equation 6)

where ω is the pole of the driver, not including the mirror coil, and A is the amplifier's dc voltage gain. The topology of driver circuit 900 was found by the present inventor to have improved AC characteristics because both the positive (+) and negative (−) outputs have the same frequency transfer function.

Figure 10:
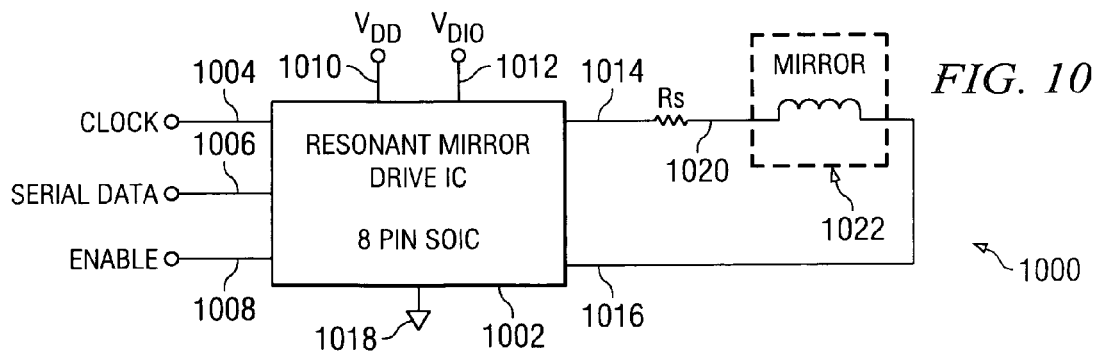
FIG. 10 is an integrated circuit for driving the mirror to produce an 8 pin device.

FIG. 10 illustrates an integrated circuit for driving the mirror utilizing the data of Table 6, for example, and a circuit such as shown in FIGS. 5 or 6, for example, to produce a low cost 8 pin device. The integrated circuit 1002 only requires connection to circuit voltage Vdd, mirror deflection voltage Vdio, ground, a clock signal 1004, a source 1006 of the serial data (PWM pattern), an enable signal 1008 and two connections 1014, 1016 to the mirror coil. A microprocessor (not shown) controlling the mirror determines the amplitude of the mirror deflection that is required, retrieves the appropriate PWM sequence from a lookup table (LUT) (not shown) and sends the bit stream to the integrated circuit 1002. The LUT need only store the bits for the first quarter of the sine wave; the microprocessor can generate the full bit stream for the entire sine wave from these bits. Alternatively, the bit stream for the first quarter of the sine wave can be used to generate the full bit stream for the entire sine wave utilizing logic circuits (not shown) in the integrated circuit 1002, as is well known to those those skilled in the art.

In view of the above, it can be seen the present invention presents a significant advancement in the art of MEMS mirror driver circuits. Further, this invention has been described in considerable detail in order to provide those skilled in the resonant scanning mirror driver circuit art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

The invention claimed is:

1. A micro-electro-mechanical system (MEMS) resonant scanning mirror driver utilizing a PWM pattern of a preselected number of bits to drive the mirror to a desired deflection comprising a selection circuit for selecting one of a grouping of PWM patterns of the preselected number of bits, the grouping having less than a predetermined maximum harmonic distortion and a linearly varying deflection amplitude.

2. The resonant scanning mirror driver circuit of claim 1 wherein a second quarter of the sine wave is generated with a time reversed version of the first quarter pattern.

3. The resonant scanning mirror driver of claim 2 wherein the second half of the sine wave is generated from the inverse of the bits representing first half of the sine wave.

4. The resonant scanning mirror driver of claim 1 wherein the second half of the sine wave is generated from the inverse of the bits representing first half of the sine wave.

5. The resonant scanning mirror driver circuit of claim 1 wherein the grouping of PWM patterns is stored in a lookup table.

6. A method of selecting PWM patterns of a given bit length for driving a resonant scanning mirror comprising:
    calculating the harmonic distortion and amplitude deflection for a subset of patterns having a preselected bit length;
    selecting patterns from the subset having a maximum harmonic distortion;
    sorting the selected patterns into bins, the number M of bins being equal to a predetermined number of steps of deflection control; and
    selecting the patterns which are closest to the center of a bin to generate a grouping of bit patterns for controlling amplitude of mirror deflection.

7. The method of claim 6 wherein the patterns are ranked in each bin utilizing:
    weight=40 * abs (pattern Amp−center Amp)+(pattern HD+90)
    where pattern Amp=amplitude of the pattern
    center Amp=amplitude of the center of the bin
    pattern HD=harmonic distortion of the pattern.

8. The method of claim 7 wherein the number of PWM bit patterns that must be searched for minimum harmonic distortion is $$2^{\left(\frac{N}{4}-1\right)}.$$

9. The method of claim 6 wherein the subset of patterns having a preselected bit length is selected for reduced harmonic distortion by:

a) generating a drive signal utilizing PWM patterns for a predetermined number of bits;
b) digitally sampling the drive signal at a rate of at least $N*f_o$, where N=the number of bits in the PWM pattern and $f_o$=the clock frequency;
c) repeating a and b at least K times where K=the Q of the system;
d) estimating the deflection of the mirror utilizing a second order linear model of the mirror dynamics converted to a discrete time model of the system;
e) generating a Fast Fourier Transform (FFT) of the estimated deflection;
f) determining harmonic distortion as ratio of power of first harmonic to sum of powers of second through ninth harmonics.

10. The method of claim 9 wherein the pattern is ranked using the formula:

$$rank = -weight_{HD} \cdot HD_n + \frac{range(HD)}{range(Amp)} Amp_n$$

where $HD_n$ is the harmonic distortion for each trial pattern, $Amp_n$ is the deflection amplitude of each trial pattern, $weight_{HD}$ is the desired weight of HD over Amp and the function range() is the max()–min() of the values in the population.

11. The method of claim 10 wherein $weight_{HD}$ is set to 1.1 to weight harmonic distortion ten percent more than amplitude.

12. The method of claim 11 wherein the number of PWM bit patterns that must be searched for minimum harmonic distortion is $$2^{(\frac{N}{4}-1)}.$$

13. The method of claim 10 wherein the number of PWM bit patterns that must be searched for minimum harmonic distortion is $$2^{(\frac{N}{4}-1)}.$$

14. A resonant scanning mirror driver circuit configured to drive a micro-electro-mechanical system (MEMS) mirror to a desired deflection utilizing a PWM pattern having 64 bits, the pattern being selected according to the desired deflection from the group consisting of:

| index | positive pattern | relative amplitude | harmonic distortion |
|---|---|---|---|
| 0 | 0xB0C2 | 2.845 | −98.17 |
| 1 | 0xB124 | 2.895 | −92.05 |
| 2 | 0xC941 | 2.942 | −96.38 |
| 3 | 0x3141 | 3.005 | −94.90 |
| 4 | 0x3218 | 3.053 | −95.59 |
| 5 | 0x4A41 | 3.125 | −94.36 |
| 6 | 0x4C24 | 3.208 | −97.53 |
| 7 | 0x5181 | 3.239 | −95.11 |

-continued

| index | positive pattern | relative amplitude | harmonic distortion |
|---|---|---|---|
| 8 | 0xE182 | 3.319 | −96.81 |
| 9 | 0xE244 | 3.367 | −93.99 |
| 10 | 0x8C44 | 3.432 | −97.66 |
| 11 | 0x8C81 | 3.481 | −92.77 |
| 12 | 0x6444 | 3.560 | −97.50 |
| 13 | 0x9301 | 3.597 | −91.58 |
| 14 | 0x1302 | 3.683 | −94.19 |
| 15 | 0x1484 | 3.729 | −97.78 |
| 16 | 0xA484 | 3.795 | −97.97 |
| 17 | 0x1884 | 3.856 | −98.05 |
| 18 | 0x2488 | 3.909 | −93.66 |
| 19 | 0x2504 | 3.969 | −97.91 |
| 20 | 0x2888 | 4.037 | −98.08 |
| 21 | 0x2904 | 4.097 | −96.77 |
| 22 | 0x4508 | 4.153 | −94.91 |
| 23 | 0xC908 | 4.208 | −92.19 |
| 24 | 0x4908 | 4.280 | −98.18 |
| 25 | 0xD108 | 4.342 | −99.94 |
| 26 | 0x5090 | 4.367 | −91.70 |
| 27 | 0xE090 | 4.433 | −90.73 |
| 28 | 0x8910 | 4.480 | −91.62 |
| 29 | 0x5208 | 4.526 | −98.36 |
| 30 | 0x6110 | 4.607 | −94.60 |
| 31 | 0x0A10 | 4.663 | −92.70 |
| 32 | 0x9210 | 4.725 | −97.39 |
| 33 | 0x0C10 | 4.784 | −96.82 |
| 34 | 0x9410 | 4.845 | −98.37 |
| 35 | 0x1410 | 4.917 | −93.69 |
| 36 | 0x9810 | 4.972 | −98.20 |
| 37 | 0x1810 | 5.044 | −92.40 |
| 38 | 0x7010 | 5.100 | −93.21 |
| 39 | 0x2420 | 5.123 | −96.65 |
| 40 | 0xC420 | 5.193 | −93.58 |
| 41 | 0x2820 | 5.251 | −98.75 |
| 42 | 0xB020 | 5.312 | −98.24 |
| 43 | 0x3020 | 5.384 | −92.38 |
| 44 | 0x3040 | 5.465 | −92.31 |
| 45 | 0x4840 | 5.473 | −97.10 |
| 46 | 0xD040 | 5.534 | −97.85 |
| 47 | 0x5040 | 5.606 | −94.63 |
| 48 | 0xE040 | 5.672 | −92.83 |
| 49 | 0xE080 | 5.764 | −94.04 |
| 50 | 0x8900 | 5.810 | −90.04 |
| 51 | 0x6080 | 5.836 | −98.88 |
| 52 | 0x9100 | 5.944 | −95.76 |
| 53 | 0x0A00 | 5.994 | −90.67 |
| 54 | 0x1100 | 6.016 | −95.83 |
| 55 | 0xA100 | 6.082 | −95.28 |
| 56 | 0x1200 | 6.128 | −96.54 |
| 57 | 0xA200 | 6.194 | −99.83 |
| 58 | 0x2200 | 6.266 | −95.22 |
| 59 | 0xA400 | 6.314 | −95.60 |
| 60 | 0x2400 | 6.386 | −98.64 |
| 61 | 0xA800 | 6.441 | −95.37 |
| 62 | 0x2800 | 6.513 | −96.00 |
| 63 | 0xB000 | 6.575 | −94.93. |

15. The resonant scanning mirror driver circuit of claim 14 wherein a second quarter of the sine wave is generated with a time reversed version of the first quarter pattern.

16. The resonant scanning mirror driver of claim 15 wherein the second half of the sine wave is generated from the inverse of the bits representing first half of the sine wave.

17. The resonant scanning mirror driver of claim 14 wherein the second half of the sine wave is generated from the inverse of the bits representing first half of the sine wave.

* * * * *